US008542834B1

(12) United States Patent
Feikis et al.

(10) Patent No.: US 8,542,834 B1
(45) Date of Patent: Sep. 24, 2013

(54) SYSTEM AND METHOD FOR SECURELY PAIRING A WIRELESS PERIPHERAL TO A HOST

(75) Inventors: John Feikis, Austin, TX (US); Robert Ashenbrenner, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 1438 days.

(21) Appl. No.: 11/836,303

(22) Filed: Aug. 9, 2007

(51) Int. Cl.
*H04K 1/00* (2006.01)

(52) U.S. Cl.
USPC ............. 380/270; 713/151; 375/140; 726/17; 726/2; 455/414; 380/277

(58) Field of Classification Search
USPC .................. 380/270, 277; 455/414; 726/2; 713/151
See application file for complete search history.

(56) References Cited

U.S. PATENT DOCUMENTS

| 6,772,331 | B1* | 8/2004 | Hind et al. ............. 713/151 |
| 6,861,944 | B1 | 3/2005 | Hoepelman |
| 6,912,657 | B2* | 6/2005 | Gehrmann ............. 713/171 |
| 7,048,183 | B2 | 5/2006 | Coughlin et al. |
| 7,110,548 | B1 | 9/2006 | Ougi et al. |
| 7,128,274 | B2 | 10/2006 | Kelley et al. |
| 7,174,031 | B2 | 2/2007 | Rhoads et al. |
| 7,194,761 | B1 | 3/2007 | Champagne |
| 7,205,882 | B2 | 4/2007 | Libin |
| 7,209,706 | B2 | 4/2007 | Fujii et al. |
| 7,215,976 | B2 | 5/2007 | Brideglall |
| 7,224,801 | B2 | 5/2007 | Abdo et al. |
| 7,685,422 | B2* | 3/2010 | Isozaki et al. ........... 713/171 |
| 7,778,601 | B2* | 8/2010 | Seshadri et al. ............ 455/41.2 |
| 8,402,182 | B2* | 3/2013 | Kalayjian et al. ............ 710/36 |
| 2004/0161111 | A1* | 8/2004 | Sherman ............... 380/283 |
| 2004/0242224 | A1* | 12/2004 | Janik et al. ............ 455/426.1 |
| 2006/0107061 | A1 | 5/2006 | Holovacs |
| 2006/0107307 | A1* | 5/2006 | Knox et al. ............... 726/2 |
| 2006/0131412 | A1 | 6/2006 | O'Brien et al. |
| 2006/0145660 | A1 | 7/2006 | Black et al. |
| 2007/0032195 | A1* | 2/2007 | Kurisko et al. ............ 455/41.2 |
| 2007/0085663 | A1 | 4/2007 | August et al. |
| 2007/0116292 | A1* | 5/2007 | Kurita et al. .............. 380/270 |
| 2007/0242729 | A1* | 10/2007 | Quinn et al. .............. 375/130 |

(Continued)

OTHER PUBLICATIONS

Wayne Jansen, Proximity based Authentication for Mobile devices, NIST, 2005, pp. 1-7.*

(Continued)

*Primary Examiner* — Nathan Flynn
*Assistant Examiner* — Viral Lakhia
(74) *Attorney, Agent, or Firm* — Charles D. Huston; Daffer McDaniel LLP (57) ABSTRACT

A device, system, and method are provided for simply and securely pairing a wireless peripheral device with a host device or system. The device, claim, and method and other peripheral devices provide for improved simplification and security of the pairing process involved with establishing a secure wireless connection between a peripheral device and a host. Simplification is improved because actions required by the user to complete the pairing process are minimized, and security is improved because of a greatly increased ability on the part of the user to ensure that pairing process is conducted in a secure environment. The pairing may be applicable to any number of host devices and peripheral devices. The host device may be a desktop computer, notebook computer, tablet computer, or similar device, and the peripheral device may be a keyboard, mouse, game controller, or personal digital assistant (PDA).

16 Claims, 4 Drawing Sheets

(56) References Cited

U.S. PATENT DOCUMENTS

| | | | |
|---|---|---|---|
| 2007/0263596 A1* | 11/2007 | Charrat | 370/351 |
| 2008/0003997 A1* | 1/2008 | Parkkinen et al. | 455/421 |
| 2008/0013601 A1* | 1/2008 | Lind et al. | 375/140 |
| 2008/0016537 A1* | 1/2008 | Little et al. | 725/81 |
| 2008/0155257 A1* | 6/2008 | Werner et al. | 713/168 |
| 2008/0220746 A1* | 9/2008 | Ekberg | 455/414.1 |
| 2008/0244714 A1* | 10/2008 | Kulakowski et al. | 726/5 |
| 2008/0253766 A1* | 10/2008 | Yu et al. | 398/41 |
| 2008/0287062 A1* | 11/2008 | Claus et al. | 455/41.2 |
| 2008/0320587 A1* | 12/2008 | Vauclair et al. | 726/17 |

OTHER PUBLICATIONS

"About NFC," © 2006 smartnfc near field communication nfc solutions, 2 pages.
"Bluetooth SIG Improves User Experience," SIG Press Releases, Mar. 27, 2007, 2 pages.
"RFID 101," RFID Gazette, Jun. 28, 2004, 6 pages.
"Identification cards—Contactless integrated circuit(s) cards—Vicinity cards—Part 3: Anti-collision and transmission protocol," © ISO/IEC 2000, pp. 1-44.
"Bluetooth Technology Overview," © 2001-2003 WTIS Ltd. Wireless Telecommunication, 4 pages.
"NFC Data Exchange Format (NDEF)," © 2005-2006 NFC Forum, pp. 1-21.
"Frequently Asked Questions," © 2007 NFC Forum, 7 pages.
"Near Field Communication," from Wikipedia, May 21, 2007, 4 pages.
"Identification cards—Contactless integrated circuit(s) cards—Proximity cards—Part 1: Physical characteristics," © ISO/IEC 1997, pp. 1-4.
"Identification cards—Contactless integrated circuit(s) cards—Proximity cards—Part 4: Transmission protocol," © ISO/IEC 2000, pp. 1-33.

* cited by examiner

SYSTEM AND METHOD FOR SECURELY PAIRING A WIRELESS PERIPHERAL TO A HOST

BACKGROUND OF THE INVENTION

1. Field of the Invention

The present invention relates in general to the field of electronic devices and, more particularly, to a device, system, and method for use in easily pairing a peripheral device with a host device for the purposes of establishing a secure channel of wireless communication between the two devices with minimal user interaction.

2. Description of the Related Art

The following descriptions and examples are not admitted to be prior art by virtue of their inclusion within this section.

In order to allow computer users more freedom of movement and cleaner workspaces, the computing industry has developed wireless peripheral devices, such as keyboards, mice, and game controllers. Generally, these wireless devices may connect with host devices (e.g. personal computers and workstations) via a wireless communication channel. Forms of wireless communication used in this application include infrared-various radio frequency ("RF") communications. RF technology allows wireless communications between peripheral devices and host devices without requiring alignment of the devices or a path free of obstructions between the devices. Several types of RF wireless technology are known in the art, including Bluetooth, Wi-Fi (802.11 a/b/g), and Ultra-Wideband (UWB).

Examples of public and un-secure radio pairings commonly used in computing device communications include Wi-Fi (802.11 a/b/g), Bluetooth, and Ultra-Wide Band. Current technology implementations do not have a defined simple and secure protocol to establish a secure communication channel and require a manual data exchange over public airspace between the host and peripheral device in order to establish a secure channel of communication. Using the public airspace to broadcast a pairing request and to exchange security information is prone to various security breaches. For instance, an eavesdropper may try to intercept a radio transmission containing a security key.

A "host" is understood to be any device or system to which other devices can connect. For example, the host may be a personal computer as shown herein, or it may be a wireless router, a docking station, or any other device or system that functions similarly insofar as it allows multiple other devices to connect to it for use and distribution of resources. Similarly, a "peripheral device" is defined to be any device capable of connecting to a host device. Examples of peripheral devices include a wireless keyboard, mouse, game controllers, and personal digital assistant (PDA) as described herein, but may also include another personal computer or a similar device.

For those using peripheral devices to enter sensitive data into a host system, such as passwords or account numbers, security is important. Here, encryption is sometimes used in order to protect such sensitive information. Encryption is the process of encoding information in such a way that only the person (or computer) with the encryption key, a code that the devices use to encrypt or decrypt a packet of information that is transmitted to or from a device, can decipher the information. The use of encryption to facilitate secure communication between a peripheral device and a host device requires that both devices are equipped with the same encryption key. A private key, or symmetric key, is an encryption/decryption key known only to the party or parties that exchange encrypted communications. Generally, systems that currently employ private key encryption technology require the person setting up the devices to manually pass the encryption key from one device to the other. The process of setting up the peripheral and host device to communicate securely using an encryption key is known in the art as "pairing."

Already, many computing devices use open and public radio technologies. To protect the data sent between the devices, a key-passed encryption method is often used. However, to install the keys, a non-radio technique has to be employed in order to prevent the key from being stolen while transmitted over open airwaves. A non-radio technique can be problematic because it requires complex wired and wireless techniques for the initial pairing. The wired method is safer but adds a used-very-rarely link, since all subsequent data transmissions are sent via radio and protected via key-based encryption. Adding the wired link also adds cost, design complexity and user complexity. Wireless methods for creating a secured pairing are known, but these methods require the user to pair the device by going through a sequence of manual steps, such as inputting the key manually.

Many wireless devices are paired through a multi-step process wherein (1) the user obtains a passcode for the peripheral device, (2) the user will then enable the wireless radio on the host device and activate a "search for devices" option in the control panel, (3) the user will then press the reset button on the peripheral device, (4) the host device will then locate the keyboard and ask the user to type in the passcode at the keyboard; and (5) the host device will then confirm the passcode and establish the connection with the peripheral device for general use.

Thus, there is a need for a device, system, and/or method for simplifying and securing the connection and pairing process between a host device and any wireless peripheral device.

SUMMARY OF THE INVENTION

The present invention overcomes the limitations of the prior art by providing a device, system, and method for simplifying and securing the connection/pairing process between a host device and a wireless peripheral device. The following description of various embodiments of secured simplified pairing devices and methods is not to be construed in any way as limiting the subject matter of the appended claims.

According to one embodiment, a wireless peripheral device will have two communication ports, the first for transmitting to a near field communication reader, and the second for exchanging wireless communications with a host. The wireless peripheral device will have a short range, read only storage medium installed with a pre-loaded encryption key. The short range, read only medium may be a radio frequency identification (RFID) tag that is capable of communicating the encryption key to a host. After the encryption key has been communicated to the host, the peripheral device is effectively paired with the host for the purposes of exchanging encrypted communications. The storage medium may be actuated to transmit the encryption key to the host by receiving an actuation signal from the host. In another embodiment, the storage medium may be actuated to transmit the encryption key to the host by a user pressing a button on the peripheral device.

According to another embodiment, a communication system is provided herein that facilitates simply and securely pairing a peripheral device to a host device. The system includes a wireless peripheral device with a pre-loaded encryption key and a host device. The host device contains a reader for securely receiving the key and subsequently exchanging encrypted communications with the peripheral device, and also a decryption engine configured to decrypt the encrypted communications using the private encryption key.

In one embodiment, a read only key may be transmitted across a first communication channel that is relatively short. This relatively near field channel signal may be configured to transmit at 0 dBm. A second relatively long communication channel may be used for subsequent communications with the peripheral device. This second, and relatively far field channel signal may be configured to transmit with a signal strength that is greater than 0 dBm. In another embodiment, the first communication channel may configured such that the first communication channel will have a range of 20 centimeters or less, so that the peripheral device must be within 20 centimeters of the host device in order to communicate with it. The second communication channel may be configured such that the host and peripheral device can communicate when they are within the range specified by the peripheral device.

In one embodiment, the communication system has a reader that can receive a security key across a first channel of communication and a reader that can receive and/or send encrypted information across a second channel of communication.

In one embodiment, the decryption engine of the communication system is coupled between an execution unit and the first and second readers for receiving the key and decrypting the encrypted information via use of the key prior to sending the decrypted information to the execution unit. The system may have a microprocessor for executing a set of instructions. Further, the communication system may have an encryption engine coupled between the execution unit, the first reader and the second reader for sending the key received from the first reader along with information received from the execution unit over the second channel via the second reader.

The communication system may have a peripheral device that is a wireless keyboard, mouse, microphone, camera, personal digital assistant (PDA), computers, or similar device. The system may also have a host device that is a personal computer, laptop computer, tablet computer, or similar device. The long communication channel may be Bluetooth, Wi-Fi (802.11 a/b/g), ultra-wideband (UWB), infrared, or a similar protocol for wireless communication, and the short communication channel may be a type of near field communication protocol. For instance, the communication protocol used for the short channel communication may be the protocol used for proximity cards and readers per ISO specification 14443.

The communication system may have an interface module configured for allowing the peripheral device to communicate with the destination device. Further, the destination device of the communication system may have an execution unit selected from the group consisting of a computer. The computer of the communication system may have memory for containing an execution program that, upon execution, transmits and receives the encrypted information, along with a corresponding private key.

In another embodiment, a method is provided for transmitting encrypted information by receiving a key from a peripheral device across a near field channel, receiving information from a peripheral device across a far field channel that is separate and apart from the near field channel, decrypting the information using the key, and executing upon the decrypted information. The method may involve placing the key within encrypted information and sending the encrypted information across the far field channel.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

A device, system, and method for wirelessly passing a pre-stored encryption key from a peripheral device to a host device are disclosed herein.

Figure 1:
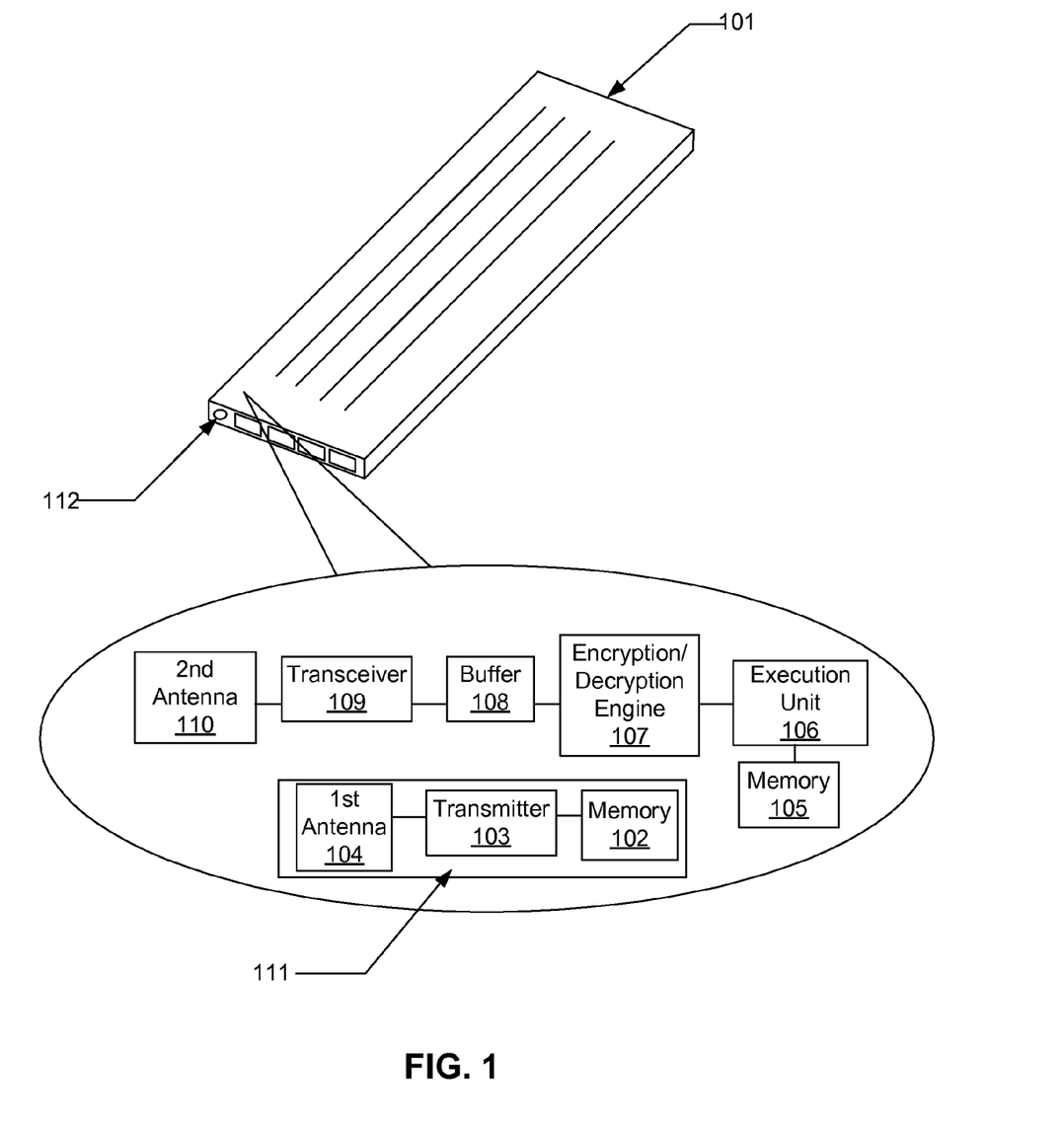
FIG. 1 is a perspective view of a peripheral device with a manual control on the side and a breakout view containing a block diagram that shows relevant internal hardware.

FIG. 1 is a perspective view of peripheral device 101 having a radio frequency identification (RFID) tag 111 that may function as a storage medium for maintaining a private key. Here, RFID tag 111 comprises memory 102, transmitter 103, and antenna 104 that may be pre-loaded with an encryption key. First antenna 104 represents a first port for transmitting the key to a prospective host device. Second antenna 110 represents a second port for sending encrypted information to a host that is configured in such a way that it can be decrypted by a host using the pre-loaded encryption key that has been transmitted via the first port. Accordingly, peripheral device 101 also contains separate memory 105, execution unit 106, encryption/decryption engine 107, buffer 108, transceiver 109, and second antenna 110 that enable the peripheral device to exchange encrypted communications with a host device.

RFID tag 111 may be activated for the purposes of transmitting the key by either receiving an activation signal from a host device, or by a manual activation caused by a user pressing button 112 on peripheral device 101. While FIG. 1 illustrates a wireless keyboard, it is noted that the device could be any wireless peripheral device, including a mouse, camera, game controller, or personal digital assistant (PDA) for the purposes of this disclosure.

RFID tag 111 is a tag that comprises an integrated circuit and coupling means. RFID tags are usually used to communicate with a reader via inductive coupling with the integrated circuit within proximity of the reader. Generally, the tag may have many of the traits of a proximity card, as described by ISO Specification 14443, which is herein incorporated by reference. When exposed to a non-modulated RF field, the tag may become active and subsequently communicate with a reader device in accordance with ISO Specification 14443 or via a similar protocol.

A reader may be an inductive coupling device that uses inductive coupling to provide power to the RFID tag and control the data exchange with the tag. The initial communication between the RFID tag and the reader may entail (1) activation of the tag by the RF operating field of the reader, (2) the tag waiting for a command from the reader, (3) the reader transmitting a command to the tag, (4) the tag transmitting a response to the reader. Here, power may be transferred by the reader producing an energizing RF field which couples to the tag to transfer power. The RF field may also be modulated for communication, and operated at a frequency of 13.56 MHz±7 kHz.

Figure 2:
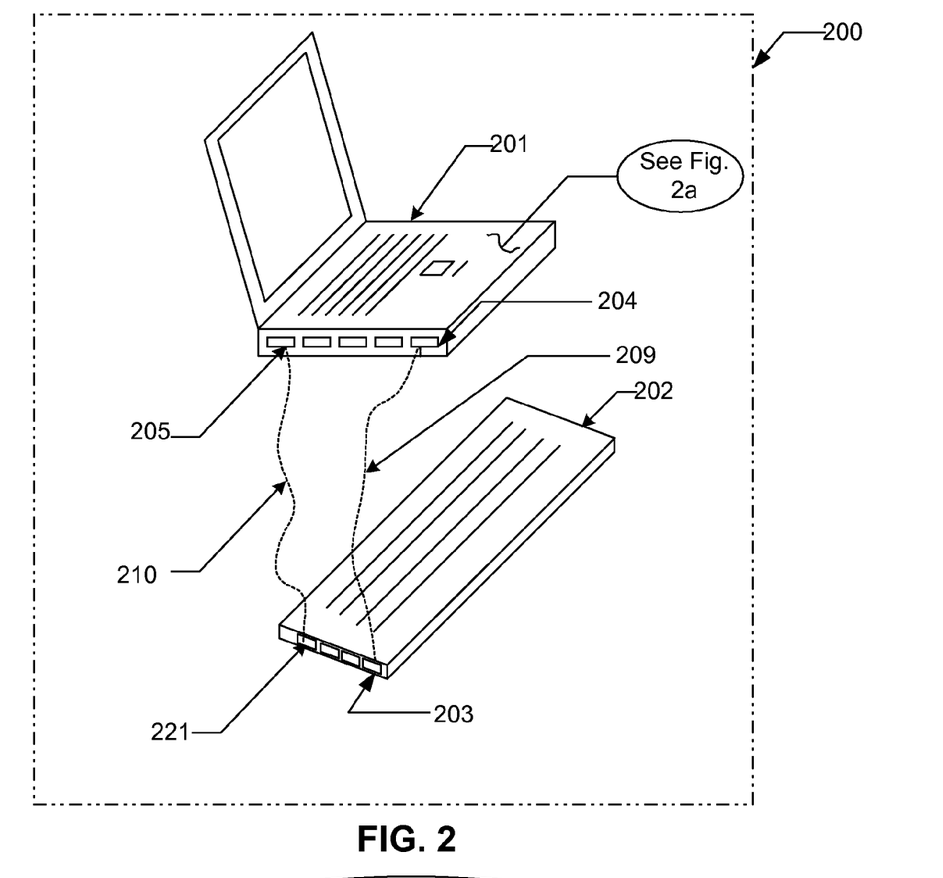
FIG. 2 is a perspective view of a system for passing a security key to a host device from a peripheral device in accordance with the invention. This view illustrates a laptop computer connected to a wireless keyboard along with two lines of communication; one for passing a security key and a second for exchanging encrypted communications.

FIG. 2 is a perspective view of system 200 having host device 201 and peripheral device 202 with tag 203 containing a pre-stored encryption key. Here, host device 201 has reader 204 configured to receive the key via short channel of communication 209 from tag 203 on peripheral device 202. FIG. 2 also shows reader 205 that may be used to receive encrypted communications transmitted from transceiver 221 of peripheral device 202 via long channel of communication 210. It is noted that readers 204 and 205 could be a single device.

Figure 2A:
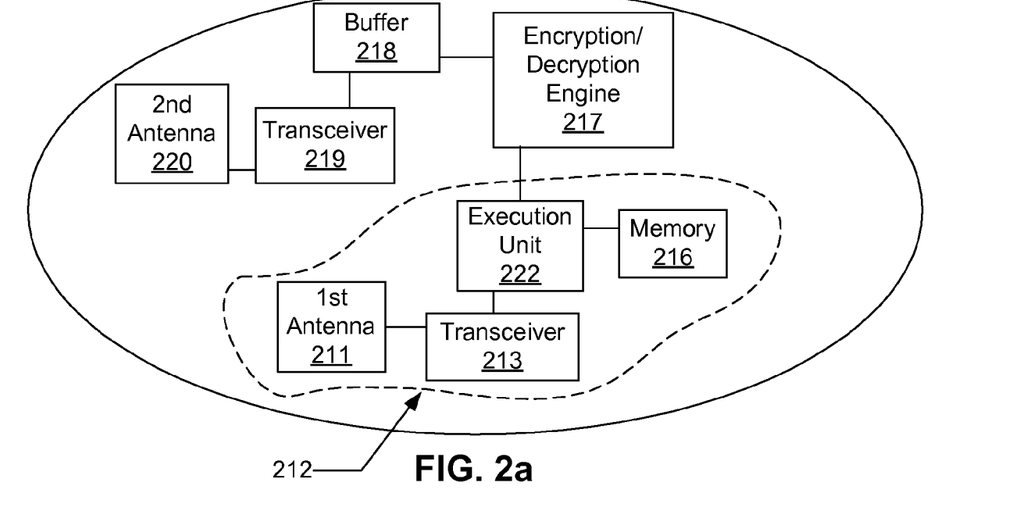
FIG. 2a is a block diagram showing relevant components of the laptop, including 2 antennae and transceivers, a buffer, an encryption/decryption engine, an execution unit, and a memory.

FIG. 2a shows a block diagram of some of the relevant hardware of host device 201. FIG. 2a shows a group of components comprised by reader 212. Here, execution unit 222 may be used to control transceiver 213 to initiate inductive coupling via short channel of communication 209. Transceiver 213, connected to a first port (or antenna) 211, receives a pre-stored encryption key from a peripheral device and stores it in memory 216. Once the pre-stored encryption key has been stored in memory 216, execution unit 222 may use the key to operate encryption/decryption engine 217, to exchange encrypted communications via buffer 218, transceiver 219, and second port (or antenna) 220 for sending and receiving encrypted communications via long channel of communication 210.

Figure 3:
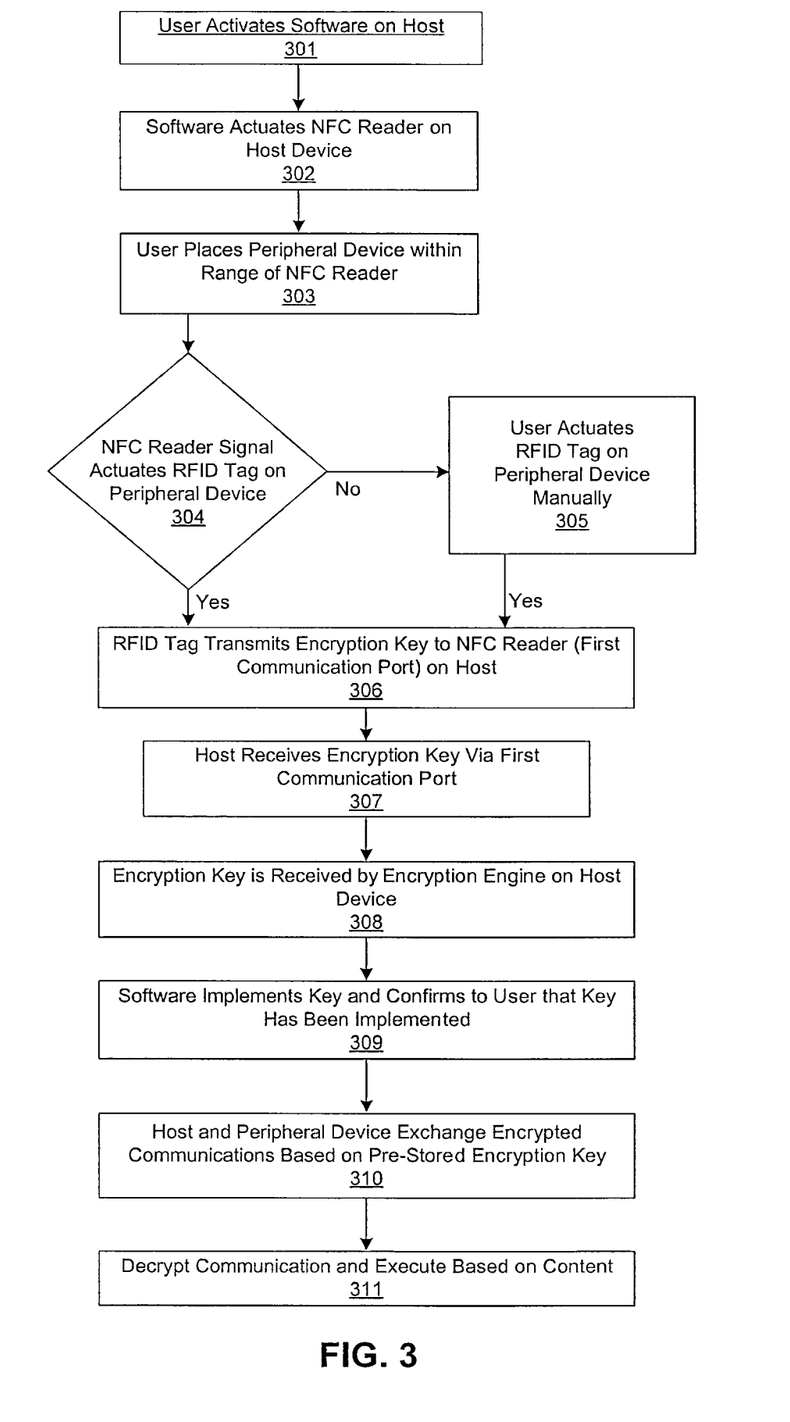
FIG. 3 is a flow chart illustrating the method for secure and simple wireless pairing disclosed herein.

FIG. 3 is a flow chart illustrating a method for wirelessly passing a pre-stored encryption key from a peripheral device to a host device. Here, a user will begin the process by activating a software program 301 on the host device to indicate that the user wishes to securely pair a new peripheral device with the host device. The software may function with the computer BIOS, and may also function as a higher level application that operates with the Microsoft Vista operating system environment. The software may also be designed to run on any operating system that supports the use of wireless peripheral devices. The software will verify that the user wishes to install a new peripheral device, and activate the near field communication reader on the host device 302. Next, the user places the peripheral device within range of the near field communication reader installed on the host device 303. At this point, the radio frequency identification tag with the pre-stored encryption key is actuated either automatically by a signal from the near field communication reader 304 or manually by the user pressing a button on the peripheral device 305. Once activated, the radio frequency identification tag will transmit the encryption key to the near field communication reader on the host device 306. After the near field communication reader receives the encryption key on the host device 307, it will pass the key to the encryption engine on the host device 308. At this point, the encryption engine will confirm to the software program which will then display a confirmation message to the user stating that the encryption key has been received 309. When the encryption key has been implemented to the encryption engine on the host device, the host device can use the key to begin exchanging encrypted communications to and from the peripheral device 310. After the encrypted communications have been received, they may be periodically fetched by the execution unit, then decrypted and executed upon based on their content 311.

Figure 4:
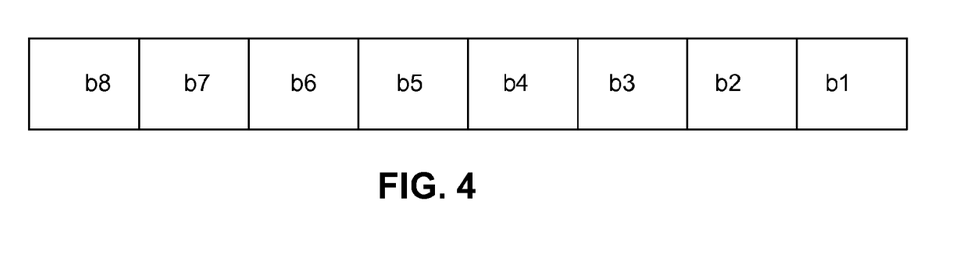
FIG. 4 shows a frame structure of a data transmission according to a protocol of the present invention.

FIG. 4 shows the data format for a proximity card communication per ISO specification 14443. In one embodiment, wireless transmission protocol ISO-14443 will be used to transmit data from the RFID tag to the reader on the host device. The byte shown in FIG. 4 may be coded in several different ways as defined by the ISO specification. The illustrated data format may be used to send the pre-stored private encryption key from the radio frequency identification tag to the reader on a host device.

Figure 5:
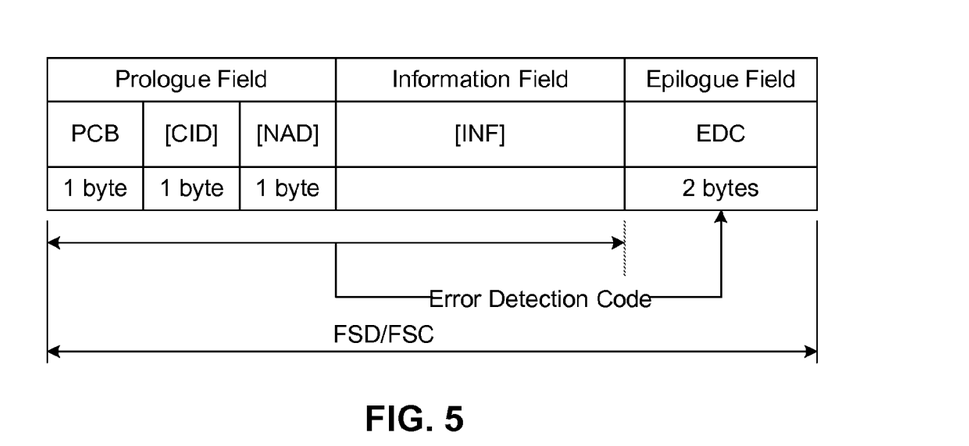
FIG. 5 shows block format of a data transmission according to a protocol of the present invention.

FIG. 5 shows a block format for a proximity card communication per ISO specification 14443. In one embodiment, wireless transmission protocol ISO-14443 will be used to transmit data from the RFID tag to the reader on the host device. The block format shown in FIG. 5 may be coded in several different ways as defined by the ISO specification.

Referring to FIG. 2, a pre-programmed, short range, read only tag 203 placed on a wireless peripheral device 202 may be used to pass the connection information to host device 201. Host 201 will collect that information and allow peripheral device 202 to connect with minimal user interaction. In this embodiment, the invention will use near field communication (NFC) as a secure communication channel 209 to obtain keys that the target peripheral device 202 and host 201 will use to establish a secure connection 210. Current RFID technology is an example of a near-field communication channel. RFID has three characteristics: (1) very low power and very short range transmissions; (2) protocol for transferring short packets of data; and (3) availability in low cost and fully integrated packages.

Near field communication is a short-range wireless connectivity technology. Near field communication is enabled by bringing two near field compatible devices to within a few centimeters of one another or by bringing the two devices into actual contact with each other. Currently, near field devices are in use for specific tasks, such as reading radio frequency identification tags. Here, the NFC reader may operate by magnetic field induction within the globally available and unlicensed radio frequency band of 13.56 MHz. The reader should have a working distance of 0-20 centimeters. The speed of the reader may be 106 kbit/s, 212 kbit/s or 424 kbit/s. The reader may operate in either a passive communication mode or an active communication mode. While in passive communication mode, the initiator device provides a carrier field and the target device answers by modulating the existing field. The device may draw its operating power from the electromagnetic field provided by the reader. In active communication mode, both the reader and the target device communicate by generating their own field.

The security of the pairing process is enhanced by the disclosed system for a number of reasons. First, by using near-field technology, only very short range access is permitted. This means that other computing devices that are not desired to see the key are limited to only those within a very short distance; in some cases less than 20 centimeters. Thus, the user can personally observe that there are no unwanted radio receivers in the area. Second, most devices would not have the NFC technology necessary to eavesdrop and intercept this type of transmission. One of the benefits of this embodiment is that only an NFC tagged peripheral device 202 can be trusted and permitted to connect to the host 201. While many computing devices have radios that can operate on public bands (802.11g for example), very few have the technology that can observe the NFC transmission 209. Third, security can be enhanced by pre-loading a host device 201 with a list of "trusted" NFC enabled peripheral device keys. If the peripheral device key is not recognized, the pairing process can be handled according to a defined security policy. The peripheral device 202 can be denied or allowed with restricted capabilities (e.g. password dialogue keyboard activities could be denied because this "untrusted" device may have a rogue keystroke logging capability activated). Fourth, this concept also fits very well with efforts to build a trusted peripheral device standard. The security of close proximity in a NFC key exchange limits exposure to an eavesdropper attempting to intercept the broadcasted information. In this embodiment, the pairing process is also simplified because the only user interaction required is to enable the NFC reader 204 and move the peripheral device 202 within the read range of the NFC reader 204.

Host device 201 will require the NFC reader technology to be available and running. Peripheral devices 202 wanting to connect to the host device 201 will require preprogrammed NFC readable tags 203 to be installed. A device pairing will be initiated by activating the NFC 204 reader and the wireless communication technology (i.e. Bluetooth or UWB) 205 on host device 201 and moving the wireless peripheral device 202 into the read range of host reader 204, usually within a few centimeters. The host reader will collect a key encoded in read only tag 203 of the wireless peripheral device and use that key to authenticate and enable secure pairing and communication 210 between the host device and the peripheral device.

Bluetooth is an industrial specification for wireless communications that provides a way to connect and exchange information between devices such as mobile phones, laptops, PCs, peripheral devices, and other similar types of devices over a secure short-range radio frequency. The specification is commonly used to enable wireless communication between a peripheral device and a host. Bluetooth uses the unlicensed Industrial, Scientific, and Medical (ISM) radio frequency band. Accordingly, most Bluetooth devices are able to function worldwide. Bluetooth supports three power standards for transmission: Class 1, which corresponds to a typical range of 100 meters and a 100 mW (20 dBm) maximum signal strength; Class 2, which corresponds to a typical range of 10 meters and a 2.5 mW (4 dBm) maximum signal strength; and Class 3, which corresponds to a typical range of 1 meter and a 1 mW (0 dBm) maximum signal strength.

A method for securely pairing peripheral device 202 with host device 201 will entail: (1) a user enabling port 205 for a relatively long channel form of communication, e.g. a Bluetooth radio, (2) the user enabling and an NFC device, e.g. RFID reader 204 on host device 201, such as a tablet PC; (3) the user then moving wireless peripheral device 202 within read range of reader 204; and (4) an encryption key being automatically read from tag 203 on peripheral device 202 to host device 201 for establishing a secure channel of communication 210. This embodiment is an improvement on the traditional and more cumbersome manual method, or use of additional wired connections, to securely pair a wireless peripheral device with a host.

Also, host device 201 may have NFC reader technology 204 installed and operational. Peripheral devices 202 that are going to be connected to host 201 will require preprogrammed NFC readable tags 203 to be installed. A device pairing will be initiated by activating NFC reader 204 and wireless communication technology 205 (i.e. Bluetooth, WiFi/WiMax, optical, or infrared) on host device 201 and moving wireless peripheral device 202 into the read range of host reader 204. Host reader 204 will collect a key encoded in read only tag 203 of wireless peripheral device 202 and use that key to authenticate and enable secure pairing and communication 210 via Bluetooth, UWB, or a similar form of communication.

The pairing protocol disclosed herein provides a number of advantages/benefits. First, once paired, peripheral device 202 and host device 201 will be able to exchange encrypted communications 210, allowing the user to take advantage of the security afforded by any supported encryption scheme. Second, the pairing can be closely monitored by the user, such that they can visually inspect the area in which the encryption key could be intercepted. This affords the user an increased sense of security in addition to making it virtually impossible for the encryption key to be intercepted by an eavesdropper. Third, ease of installation is greatly improved because the only actions required by the user involve initiating the pairing and placing peripheral device 202 within range of reader 204 on host device 201. The user avoids the burden of establishing a wired connection for the initial pairing and the alternative of manually keying in a code to complete the pairing process.

It can thus be appreciated that a new and novel device, system, and method for simply and securely pairing a peripheral device with a host device has been disclosed. Upon reading this disclosure, those of skill in the art will appreciate still additional alternative methods and designs for a secure simplified pairing in accordance with the present invention.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A peripheral device, comprising:
   a storage medium for maintaining a private encryption key;
   a first antenna for transmitting the private encryption key from the peripheral device to a host device across a first channel, wherein the first channel comprises a near field transmission path having a range less than 20 centimeters in ambient air; and
   a second antenna, distinct from the first antenna, for subsequently transmitting encrypted information configured to be decrypted by the private encryption key from the peripheral device to the host device across a second channel, distinct from the first channel, wherein the second channel comprises a relatively far field transmission path having a range greater than 20 centimeters in ambient air, and wherein the second channel is configured to transmit the encrypted information according to a wireless communication technology selected from a group consisting of Bluetooth, WiFi, WiMax and Ultra Wide Band (UWB).

2. The peripheral device as recited in claim 1, wherein the private encryption key comprises a radio frequency identification tag.

3. The peripheral device as recited in claim 1, wherein the private encryption key transmission is initiated manually.

4. The peripheral device as recited in claim 1, wherein the private encryption key transmission is initiated automatically.

5. The peripheral device recited in claim 1, wherein the peripheral device is selected from a group consisting of wireless keyboards, mice, microphones, cameras, personal digital assistants (PDAs), joysticks/gaming controllers, and computers.

6. A communication system, comprising:
a peripheral device comprising:
a storage medium for maintaining a private encryption key; and
an antenna for transmitting the private encryption key across a short communication channel having a range less than 20 centimeters in ambient air;
a host device comprising:
a storage medium for maintaining one or more trusted keys;
a reader configured for (i) receiving the private encryption key sent from the peripheral device across the short communication channel, and (ii) subsequently receiving encrypted information sent from the peripheral device across a long communication channel, which is distinct from the short communication channel wherein a range of the long communication channel is greater than 20 centimeters in ambient air; and wherein the long communication channel is selected from a group consisting of Bluetooth, WiFi, WiMax and Ultra Wide Band (UWB) and optical wireless communication technologies; and
a decryption engine configured to decrypt the encrypted information via the private encryption key if the private encryption key transmitted across the short communication channel matches one of the one or more trusted keys.

7. The communication system as recited in claim 6, wherein the short communication channel is configured to transmit signals less than or equal to 0 dBm.

8. The communication system as recited in claim 6, wherein the long communication channel is configured to transmit signals greater than or equal to 0 dBm.

9. The communication system as recited in claim 6, wherein the reader comprises a first reader for receiving the private encryption key across the short communication channel and a second reader for receiving the encrypted information across the long communication channel.

10. The communication system as recited in claim 9, wherein the decryption engine is coupled between an execution unit and the first and second readers for receiving the private encryption key and decrypting the encrypted information via use of the private encryption key prior to sending the decrypted information to the execution unit.

11. The communication system as recited in claim 9, further comprising an encryption engine coupled between the execution unit, the first reader and the second reader for sending the private encryption key received from the first reader along with information received from the execution unit over the long communication channel via the second reader.

12. The communication system as recited in claim 6, wherein the host device further comprises an execution unit comprises a processor for executing an instruction set.

13. The communication system as recited in claim 6, wherein the peripheral device is selected from a group consisting of wireless keyboards, mice, microphones, cameras, personal digital assistants (PDAs), and computers.

14. The communication system as recited in claim 6, wherein the host device is selected from a group consisting of personal computers, laptop computers, and tablet computers.

15. The communication system as recited in claim 6, wherein the host device further comprises memory for containing an execution program that, upon execution, transmits and receives the encrypted information, along with a corresponding said private encryption key.

16. A method for establishing a secure channel of wireless communication, comprising:
maintaining a list of one or more trusted keys;
receiving a private encryption key transmitted from a peripheral device across a near field wireless communication channel;
comparing the private encryption key transmitted across the near field wireless communication channel to the list of trusted keys, wherein if the private encryption key matches one of the trusted keys the method further comprises:
subsequently receiving encrypted information transmitted from the peripheral device across a far field wireless communication channel, which is separate and apart from the near field wireless communication channel and selected from a group consisting of Bluetooth, WiFi, WiMax and Ultra Wide Band (UWB), infrared and optical wireless communication technologies;
decrypting the encrypted information using the private encryption key; and
executing upon the decrypted information.

* * * * *

UNITED STATES PATENT AND TRADEMARK OFFICE
CERTIFICATE OF CORRECTION

PATENT NO.         : 8,542,834 B1
APPLICATION NO.    : 11/836303
DATED              : September 24, 2013
INVENTOR(S)        : Feikis et al.

Page 1 of 1

It is certified that error appears in the above-identified patent and that said Letters Patent is hereby corrected as shown below:

IN THE CLAIMS:

Claim 1, col. 8, line 67: delete the word "relatively" after phrase "channel comprises a"

Signed and Sealed this
Eleventh Day of March, 2014

Michelle K. Lee
*Deputy Director of the United States Patent and Trademark Office*